US007236862B2

(12) United States Patent
Kanno

(10) Patent No.: US 7,236,862 B2
(45) Date of Patent: Jun. 26, 2007

(54) REMOTE MAINTENANCE SYSTEM

(75) Inventor: Satoru Kanno, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 412 days.

(21) Appl. No.: 10/491,436

(22) PCT Filed: Oct. 16, 2002

(86) PCT No.: PCT/JP02/10758

§ 371 (c)(1), (2), (4) Date: Apr. 12, 2004

(87) PCT Pub. No.: WO03/034166

PCT Pub. Date: Apr. 24, 2003

(65) Prior Publication Data

US 2004/0255261 A1 Dec. 16, 2004

(30) Foreign Application Priority Data

Oct. 16, 2001 (JP) ............................ 2001-318118

(51) Int. Cl.
*G06F 19/00* (2006.01)

(52) U.S. Cl. .......................... 701/33; 701/29; 340/438

(58) Field of Classification Search .................. 701/29, 701/30, 33, 35; 340/438, 439, 457.4
See application file for complete search history.

(56) References Cited

U.S. PATENT DOCUMENTS 6,263,268 B1 * 7/2001 Nathanson ................... 701/29
6,295,492 B1 * 9/2001 Lang et al. ................... 701/33
6,389,337 B1 * 5/2002 Kolls .......................... 701/29
6,404,329 B1 * 6/2002 Hsu ........................... 340/438
6,636,790 B1 * 10/2003 Lightner et al. .............. 701/33
6,711,495 B1 3/2004 Ukai et al.
7,092,803 B2 * 8/2006 Kapolka et al. .............. 701/29
2002/0007237 A1 * 1/2002 Phung et al. ................. 701/33
2002/0156558 A1 * 10/2002 Hanson et al. ................ 701/33
2003/0163233 A1 * 8/2003 Song et al. ................... 701/33

FOREIGN PATENT DOCUMENTS

EP 1 069 535 A2 1/2001

(Continued)

*Primary Examiner*—Gary Chin
(74) *Attorney, Agent, or Firm*—Arent Fox LLP

(57) ABSTRACT

A remote maintenance system is provided that can perform maintenance on a mobile object by manipulations from a remote location. If a malfunction occurs in a vehicle (4), an ECU of the vehicle (4) is connected to a communication server (3) at a dealer (7). Next, an engineer of a maker (6) starts a maintenance terminal (1) in response to notification from the dealer (7) to transmit a command for requesting a DTC to the communication server (3). The DTC request command is transmitted to the ECU via a data management server (5) and the communication server (3), and the ECU transmits the DTC toward the maintenance terminal (1). The DTC which has been transmitted from the vehicle (4) is input to the maintenance terminal (1) via the communication server (3) and the data management server (5) and is displayed on the maintenance terminal (1). The engineer of the maker (6) evaluates the condition of the vehicle (4) using the displayed DTC, and then provides appropriate instructions to a technician of the dealer (7) and performs maintenance on the vehicle (4) by manipulating the maintenance terminal (1) on his own initiative.

4 Claims, 9 Drawing Sheets

FOREIGN PATENT DOCUMENTS

| | | | |
|---|---|---|---|
| EP | 1 081 670 | A2 | 3/2001 |
| JP | 7-15427 | | 2/1995 |
| JP | 7-166582 | | 6/1995 |
| JP | 9-106381 | A | 4/1997 |
| JP | 11-24744 | | 1/1999 |
| JP | 2000-92111 | A | 3/2000 |
| JP | 2000-132364 | | 5/2000 |
| JP | 2000-132364 | A | 5/2000 |
| JP | 2000-163295 | A | 6/2000 |
| JP | 2001-005671 | A | 1/2001 |
| JP | 2001-76012 | | 3/2001 |
| JP | 2001-076012 | A | 3/2001 |
| JP | 2001-250190 | A | 9/2001 |
| JP | 2001-296915 | | 10/2001 |
| JP | 2002-167809 | | 6/2002 |
| JP | 2002-173954 | | 6/2002 |
| JP | 2002-215819 | | 8/2002 |
| JP | 2002-215819 | A | 8/2002 |

* cited by examiner

FIG. 5

| NO. | REQUEST MESSAGE TYPE | <1> | <2> | <3> | <4> | <5> | <6> | <7> | <8> | <9> | <10> | <11> |
|---|---|---|---|---|---|---|---|---|---|---|---|---|
| (1) | REQUEST DUMMY MESSAGE | 68h | 6Ah | F0h | 01h | 00h | — | — | — | — | — | CSh |
| (2) | REQUEST FULL CURRENT DATA LIST | 68h | 6Ah | F0h | 01h | 00h | — | — | — | — | — | CSh |
| (3) | REQUEST EXTENDED CURRENT DATA LIST | 68h | 6Ah | F0h | 01h | 40h | — | — | — | — | — | CSh |
| (4) | REQUEST CURRENT DATA | 68h | 6Ah | F0h | 01h | PID | — | — | — | — | — | CSh |
| (5) | REQUEST FREEZE DATA CAUSE DTC | 68h | 6Ah | F0h | 02h | 02h | — | — | — | — | — | CSh |
| (6) | REQUEST FULL FREEZE DATA LIST | 68h | 6Ah | F0h | 02h | 00h | — | — | — | — | — | CSh |
| (7) | REQUEST EXTENDED FREEZE DATA LIST | 68h | 6Ah | F0h | 02h | 40h | — | — | — | — | — | CSh |
| (8) | REQUEST FREEZE DATA | 68h | 6Ah | F0h | 02h | PID | — | — | — | — | — | CSh |
| (9) | REQUEST DTC NUMBER | 68h | 6Ah | F0h | 01h | 01h | — | — | — | — | — | CSh |
| (10) | REQUEST DTC | 68h | 6Ah | F0h | 03h | — | — | — | — | — | — | CSh |
| | ⋮ | ⋮ | | | | | | | | | | |

A) <4> THROUGH <10> FORM A DATA AREA HAVING A MAXIMUM LENGTH OF 7 BYTES
B) <11> INCLUDES CS: CHECKSUM
C) PID:PARAMETER IDENTIFICATION

FIG. 6

| NO. | RESPONSE MESSAGE TYPE | <1> | <2> | <3> | <4> | <5> | <6> | <7> | <8> | <9> | <10> | <11> |
|---|---|---|---|---|---|---|---|---|---|---|---|---|
| (1) | DUMMY MESSAGE | 48h | 6Bh | AD | 41h | 00h | XA | XB | XC | XD | — | CSh |
| (2) | FULL CURRENT DATA LIST | 48h | 6Bh | AD | 41h | 00h | XA | XB | XC | XD | — | CSh |
| (3) | EXTENDED CURRENT DATA LIST | 48h | 6Bh | AD | 41h | 40h | XA | XB | XC | XD | — | CSh |
| (4) | CURRENT DATA | 48h | 6Bh | AD | 41h | PID | XA | XB | XC | XD | — | CSh |
| (5) | FREEZE DATA CAUSE DTC | 48h | 6Bh | AD | 42h | 02h | 00h | DTC | | — | — | CSh |
| (6) | FULL FREEZE DATA LIST | 48h | 6Bh | AD | 42h | 00h | 00h | XA | XB | XC | XD | CSh |
| (7) | EXTENDED FREEZE DATA LIST | 48h | 6Bh | AD | 42h | 40h | 00h | XA | XB | XC | XD | CSh |
| (8) | FREEZE DATA | 48h | 6Bh | AD | 42h | PID | 00h | XA | XB | XC | XD | CSh |
| (9) | DTC NUMBER | 48h | 6Bh | AD | 41h | 01h | XA | XB | XC | XD | — | CSh |
| (10) | DTC | 48h | 6Bh | AD | 43h | DTC#1 | | DTC#2 | | DTC#3 | | CSh |
| | ⋮ | ⋮ | | | | | | | | | | |

A) <4> THROUGH <10> FORM A DATA AREA HAVING A MAXIMUM LENGTH OF 7 BYTES
B) <11> INCLUDES CS: CHECKSUM
C) PID:PARAMETER IDENTIFICATION
D) AD: ECU INTERNAL ADDRESS
E) DTC:DIAGNOSTIC TROUBLE CODE
F) XA: DATA A, XB: DATA B, XC: DATA C AND XD: DATA B FORM INFORMATION OF 32 BITS IN TOTAL
G) <7> THROUGH <9> OF (4) CURRENT DATA AND <8> THROUGH <10> OF (8) FREEZE DATA HAVE VARIABLE LENGTHS DEPENDING ON PID
H) THREE DTCS EACH HAVING A LENGTH OF 16 BYTES ARE RETURNED AS (10) DTC

FIG. 9A

DATA STRUCTURE

| TRANSMISSION SOURCE (20 BYTES) | TRANSMISSION DESTINATION (20 BYTES) | DATA OR COMMAND AREA (VARIABLE LENGTH) |
|---|---|---|

FIG. 9B DATA TYPE AND DIRECTION

| NO. | DATA TYPE | COMMAND | TRANSMISSION SOURCE | TRANSMISSION DESTINATION |
|---|---|---|---|---|
| (1) | REQUEST COMMUNICATION SERVER COMMAND | GETDATA | SERVER | CLIENT |
| (2) | TRANSMIT MAINTENANCE TERMINAL COMMAND | PUTDATA | CLIENT | SERVER |
| (3) | REQUEST MAINTENANCE TERMINAL DATA | GETDATA | CLIENT | SERVER |
| (4) | TRANSMIT COMMUNICATION SERVER DATA | PUTDATA | SERVER | CLIENT |

CLIENT:MAINTENANCE TERMINAL SERVER:COMMUNICATION SERVER

FIG. 9C DATA FILE

| NO. | FILE TYPE | TYPE | FILE NAME | FILE CONTENTS |
|---|---|---|---|---|
| (1) | SEQUENTIAL MANAGEMENT FILE | REQUEST DATA OR COMMAND | GET-TRANSMISSION DESTINATION -TRANSMISSION SOURCE | SEQUENTIAL NUMBER UP TO $2^{64}$ |
| (2) | SEQUENTIAL MANAGEMENT FILE | TRANSMIT DATA OR COMMAND | PUT-TRANSMISSION DESTINATION -TRANSMISSION SOURCE | SEQUENTIAL NUMBER UP TO $2^{64}$ |
| (3) | TRANSMISSION AND RECEPTION BUFFER FILE | REQUEST DATA OR COMMAND | TRANSMISSION DESTINATION-TRANSMISSION SOURCE-SEQUENTIAL NUMBER | RELAY DATA OR COMMAND |
| (4) | TRANSMISSION AND RECEPTION BUFFER FILE | TRANSMIT DATA OR COMMAND | TRANSMISSION SOURCE-TRANSMISSION DESTINATION-SEQUENTIAL NUMBER | RELAY DATA OR COMMAND |

REMOTE MAINTENANCE SYSTEM

CROSS-REFERENCE TO RELATED APPLICATION

This application is a National Stage entry of International Application No. PCT/JP02/10758, filed Oct. 16, 2002, the entire specification claims and drawings of which are incorporated herewith by reference.

TECHNICAL FIELD

The present invention relates to a remote maintenance system which performs maintenance on mobile objects including, for example, vehicles and motorcycles, from a remote location.

BACKGROUND ART

Conventionally, when performing maintenance on mobile objects including, for example, cars, motorcycles, and ships, a control device, for example, an ECU (Electronic Control Unit) which is provided in the mobile objects acquires data indicating the conditions of various sensors, various actuators, and so forth which are provided at various positions in the mobile objects to control the mobile objects, and performs failure diagnosis. In addition, in order to operate the sensors and the actuators normally, a new control program and new data is set in the control device based on the results of the diagnosis. When data is set in a control device for a mobile object or when data is acquired from the control device in this manner, in order to manipulate a terminal which is provided with an interface with the control device, an engineer goes to a location at which the mobile object and the terminal are located, and then conducts operations. Alternatively, if the engineer cannot go to the location, the engineer makes a worker on the spot manipulate the terminal while instructing the worker via a telephone and so forth.

Furthermore, a device which performs maintenance on mobile objects in this manner is known and is disclosed, for example, in Japanese Examined Patent Application, Second Publication No. Hei 7-15427. This device transmits data to and receives data from an electronic control device and performs failure diagnosis of actuators provided at various positions of a car, by using a failure diagnosis device which is connected to the electronic control device of the car or by using an expert computer which is connected to the failure diagnosis device. The expert computer is further connected to a host computer via a telephone line, receives programs and data for failure diagnosis of a maker level which are supplied from the host computer, and builds a database in the host computer based on the data which has been acquired from the electronic control device.

By doing so, it is not only possible to readily perform failure diagnosis using the failure diagnosis device but it is also possible to perform advanced failure diagnosis using the expert computer which is supplied with the program and the data for failure diagnosis of a maker level from the host computer when the need arises.

The aforementioned conventional devices can easily perform maintenance on a mobile object by transmitting and receiving data to and from a control device which is provided in the mobile object using a failure diagnosis device; however, an engineer who performs maintenance using the failure diagnosis device must go to a location at which the mobile object and the failure diagnosis device are located or a location at which the expert computer is located in order to manipulate the failure diagnosis device or the expert computer, thereby causing a problem of deteriorating the working efficiency. There is also a problem of the cost of the travel of the engineer.

Moreover, when the engineer does not go to the location, it is necessary to make the worker on the spot perform the work for the engineer in accordance with instructions from the engineer, so that it requires a great deal of labor to exactly instruct the worker on the contents of the work.

Furthermore, since it is not possible to simultaneously monitor the conditions of a plurality of mobile objects if it is necessary to perform maintenance on the mobile objects, there is a problem in that it is impossible to deal with situations for which immediate measures must be taken.

DISCLOSURE OF INVENTION

The present invention has been made in consideration of the aforementioned problems, and an object the present invention is to provide a remote maintenance system that can perform maintenance on mobile objects by means of manipulations from a remote location.

In order to solve the problems described above, a remote maintenance system according to the present invention is a remote maintenance system which performs maintenance on a mobile object by monitoring a control device (for example, an ECU 11 in the embodiment) of the mobile object from a remote location comprising: a maintenance terminal (for example, a maintenance terminal 1 in the embodiment) which is connected to a communication network (for example, a communication network 2 in the embodiment), displays maintenance information indicating the condition of the mobile object which has been received from the communication network for an operator, and transmits control information for the control device to the communication network; and a communication server (for example, a communication server 3 in the embodiment) which is connected between the control device and the communication network, transmits the maintenance information which has been acquired from the control device to the maintenance terminal, and receives the control information which has been transmitted from the maintenance terminal to set the control information in the control device.

In the remote maintenance system having the structure above, the communication server obtains the maintenance information indicating the condition of the mobile object from the control device of the mobile object, and then transmits it to the maintenance terminal. The maintenance terminal displays the maintenance information for an operator of the maintenance terminal to prompt the operator to input control information for the mobile object, and transmits control information which has been input by the operator to the communication server. The communication server which has received the control information sets this control information in the control device so as to operate the control device, thereby allowing the operator of the maintenance terminal to operate the control device from a remote location.

As a result, it is not necessary for the operator of the maintenance terminal to go to a location at which the mobile object is located, so that time and cost due to travel can be reduced. The reduction in time due to travel makes it possible to improve the efficiency of maintenance.

Moreover, the control device can be freely manipulated via the maintenance terminal, and it is possible to deal with an event for which immediate measures must be taken.

Furthermore, since the maintenance terminal can function so long as it is connected to the communication network, the operator of the maintenance terminal can perform maintenance regardless of the location at which the mobile object is located and the location at which the operator is present.

In addition, since maintenance can be performed so long as it is connected to the communication network, it is possible to perform maintenance regardless of the number of mobile objects.

Moreover, the operator of the maintenance terminal can easily obtain logging data regarding the mobile object which is the subject of maintenance.

The remote maintenance system according to the present invention may further comprise a data management server (for example, a data management server 5 in the embodiment) which stores the maintenance information and the control information which are transmitted and received between the maintenance terminal and the communication server, and mediates communications between the maintenance terminal and the communication server, and the maintenance terminal and the communication server may transmit and receive the maintenance information and the control information via the data management server.

In the remote maintenance system having the structure above, the data management server temporarily stores communication data from the maintenance terminal to the communication server and communication data from the communication server to the maintenance terminal, and thus it is possible to obtain the communication data at the timing requested by the maintenance terminal or the communication server.

Accordingly, it is possible to improve efficiency of communications between the maintenance terminal and the communication server. Moreover, since the data management server controls the data flow by buffering the data, it is sufficient for the maintenance terminal to communicate with the data management server as a specific communication party even when a plurality of pieces of data are transmitted and received between the maintenance terminal and a plurality of mobile objects. Thus, it is possible to reduce the load on the communication processes.

In the remote maintenance system according to the present invention, the data management server may store the maintenance information in a file whose file name includes information indicating a transmission source and a transmission destination of the maintenance information and may store the control information in a file whose file name includes information indicating a transmission source and a transmission destination of the control information.

The remote maintenance system having the structure above can easily distinguish data transmitted and received among a plurality of communication servers and a plurality of maintenance terminals, and can relay a plurality of pieces of transmission and reception data by identifying the transmission source and the transmission destination of the plurality of pieces of transmission and reception data based on the file names when the maintenance terminal or the communication server request the data.

Accordingly, when the data management server relays the transmission and reception data between the plurality of communication servers and the plurality of maintenance terminals, it is possible to relay the transmission and reception data between a correct transmission source and a correct transmission destination. Moreover, since information regarding the transmission source and the transmission destination can be identified without inspecting the contents of the transmission and reception data, it is possible to improve the efficiency of communication.

BRIEF DESCRIPTION OF DRAWINGS

FIG. 5 is a diagram showing the structure of request message data which is transmitted and received in the remote maintenance system according to the embodiment.

FIG. 6 is a diagram showing the structure of response message data which is transmitted and received in the remote maintenance system according to the embodiment.

FIGS. 9A to 9C are diagrams showing the structure of data transmitted and received to and from the data management server, which is provided in the remote maintenance system according to the embodiment, and a data file management method performed by the data management server.

BEST MODE FOR CARRYING OUT THE INVENTION

Hereinbelow, an embodiment of the present invention will be explained with reference to the drawings.

Figure 1:
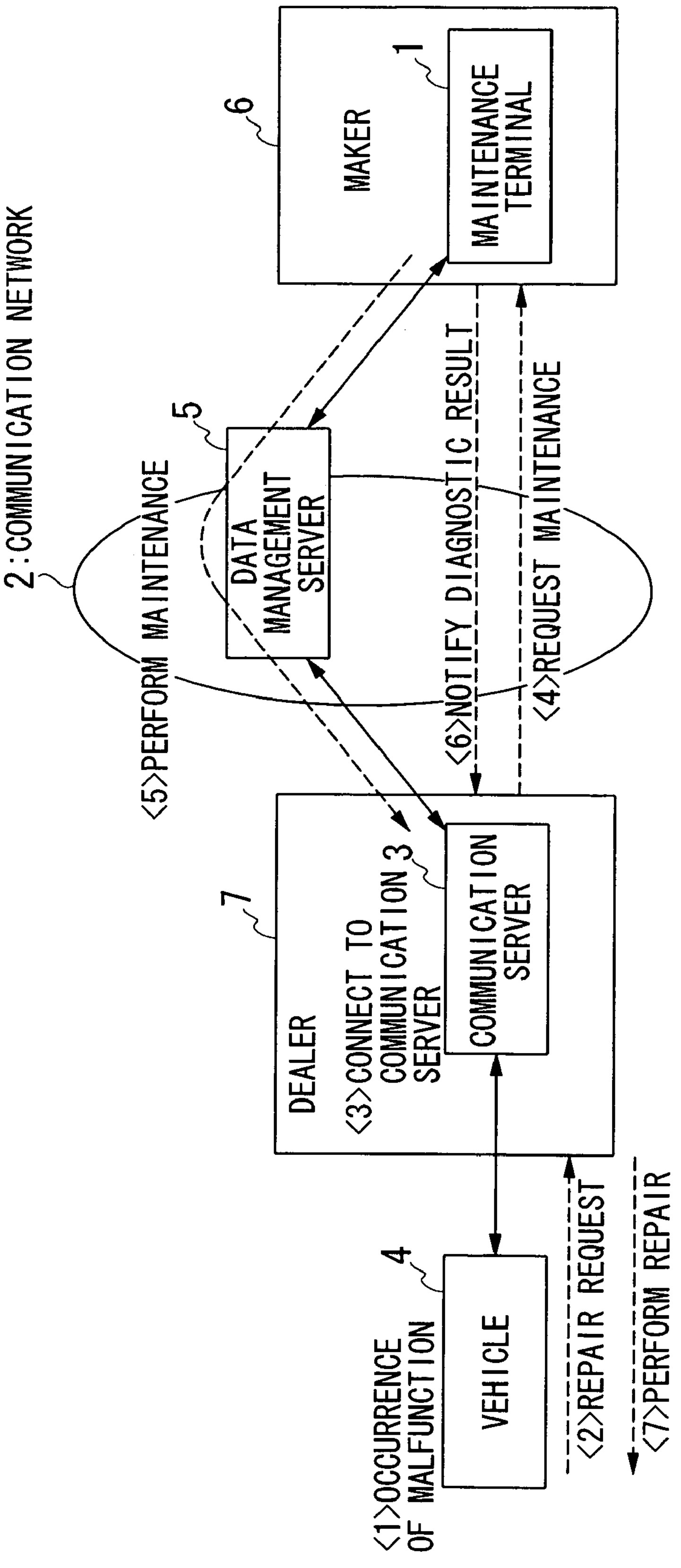
FIG. 1 is a block diagram showing the structure of a remote maintenance system according to an embodiment of the present invention.

FIG. 1 is a block diagram showing the structure of a remote maintenance system according to the embodiment of the present invention. It is noted that the present embodiment will be described with respect to a vehicle as an example of a mobile object which is the subject of maintenance.

As shown in FIG. 1, the remote maintenance system according to the present embodiment is a system which connects a maintenance terminal 1 to a communication server 3 through a communication network 2 to thereby efficiently perform maintenance on a vehicle 4 from a remote location, and in which a data management server 5 relays data transmitted and received between the maintenance terminal 1 and the communication server 3.

In FIG. 1, the maintenance terminal 1 is a client terminal which is used by, for example, an engineer of a maker 6 to perform maintenance on the vehicle 4 located at a remote location, and the maintenance terminal 1 displays maintenance information indicating the condition of the vehicle 4 which is the subject of the maintenance for an operator and transmits control information based on the manipulations performed by the operator who has confirmed the displayed information. It is noted that an input device, a display device (not shown in the figures), and so forth are connected to the maintenance terminal 1. Here, the input device is a keyboard, a mouse, and so forth. The display device is an image display device such as a CRT (Cathode Ray Tube) display device and a liquid crystal display device or a speech synthesizing device such as a speaker.

The communication network 2 is connected to the maintenance terminal 1 so that the maintenance terminal 1 may acquire the maintenance information from the vehicle 4 located at a remote location which is the subject of the maintenance, and transmits and receives information by, for example, wireless communication in accordance with a WAP (Wireless Application Protocol), or wire communication via the Internet which takes advantages of a TCP/IP (Transmission Control Protocol/Internet Protocol) and WWW (World Wide Web) or a public network such as a PSTN (Public Switch Telephone Network) and ISDN (Integrated Services Digital Network).

In addition, the communication server 3 is installed, for example, in a dealer 7 of the vehicle, is connected to the vehicle 4 which is the subject of the maintenance, and is provided with an interface to transmit and receive data to and from a control device of the vehicle 4. The communication server 3 along with transmitting data which has been obtained from the control device of the vehicle 4 to the maintenance terminal 1 via the communication network 2, sets control information which has been received from the maintenance terminal 1 via the communication network 2 in the control device of the vehicle 4. It is noted that, at this time, the communication server 3 converts a communication protocol used for data transmission and reception on the communication network 2 into a communication protocol for data transmission and reception with the control device of the vehicle 4, and vice versa.

The vehicle 4 is a mobile object which is the subject of the maintenance by the remote maintenance system according to the present embodiment, and is provided with a control device which transmits and receives information about sensors and actuators which are connected to the communication server 3 and are disposed at various positions of the vehicle. It is noted that the details of the vehicle 4 will be described later.

The data management server 5 is an HTTP (Hyper Text Transfer Protocol) server which mediates communications between the maintenance terminal 1 and the communication server 3, temporarily stores communication data transmitted from the communication server 3 to the maintenance terminal 1 and communication data transmitted from the maintenance terminal 1 to the communication server 3 so as to acquire the communication data at the timing requested by the maintenance terminal 1 or the communication server 3. In addition, for example, when the maintenance terminal 1 and the communication server 3 belong to their respective intranets, the data management server 5 mediates communications therebetween to realize the communication between the maintenance terminal 1 and the communication server 3 beyond proxy-servers and fire-walls which perform packet filtering in the intranets.

It is noted that one or more servers 3 are connected to the communication network 2 in conformity with the number of the dealers 7 described above. Moreover, it would be acceptable to install a plurality of maintenance terminals 1 in the maker 6 in accordance with the contents of maintenance, to connect the maintenance terminals 1 to the communication network 2, and to manipulate the maintenance terminals 1.

Furthermore, an example of the flow of the processing by the remote maintenance system according to the present embodiment will be briefly explained with reference to FIG. 1. First, when a malfunction occurs in the vehicle 4 (<1> occurrence of malfunction), the user of the vehicle 4 carries the vehicle 4 in the dealer 7 (<2> repair request).

At the dealer 7, a technician connects the control device of the vehicle 4 to the communication server 3 (<3> connect to communication server), and makes a telephone call to the maker 6 to request the maintenance (<4> request maintenance).

At the maker 6, an engineer starts the maintenance terminal 1 to acquire maintenance information indicating the condition of the vehicle 4 from the control device of the vehicle 4 via the data management server 5, thereby performing failure diagnosis (<5> perform maintenance).

Subsequently, when the result of the failure diagnosis is obtained, the technician of the dealer 7 is notified (<6> notify diagnostic result).

The technician of the dealer 7 who has been notified of the result of the failure diagnosis performs the repair of the vehicle 4 (<7> perform repair).

It is noted that it would be acceptable for the maintenance terminal 1 to set a control program and control data in the control device of the vehicle 4 to perform the repair of the vehicle, instead of notifying the technician of the dealer 7 of the result of the failure diagnosis.

Next, the structure of the vehicle 4 for which the remote maintenance system according to the present embodiment performs maintenance will be explained with reference to the drawings.

Figure 2:
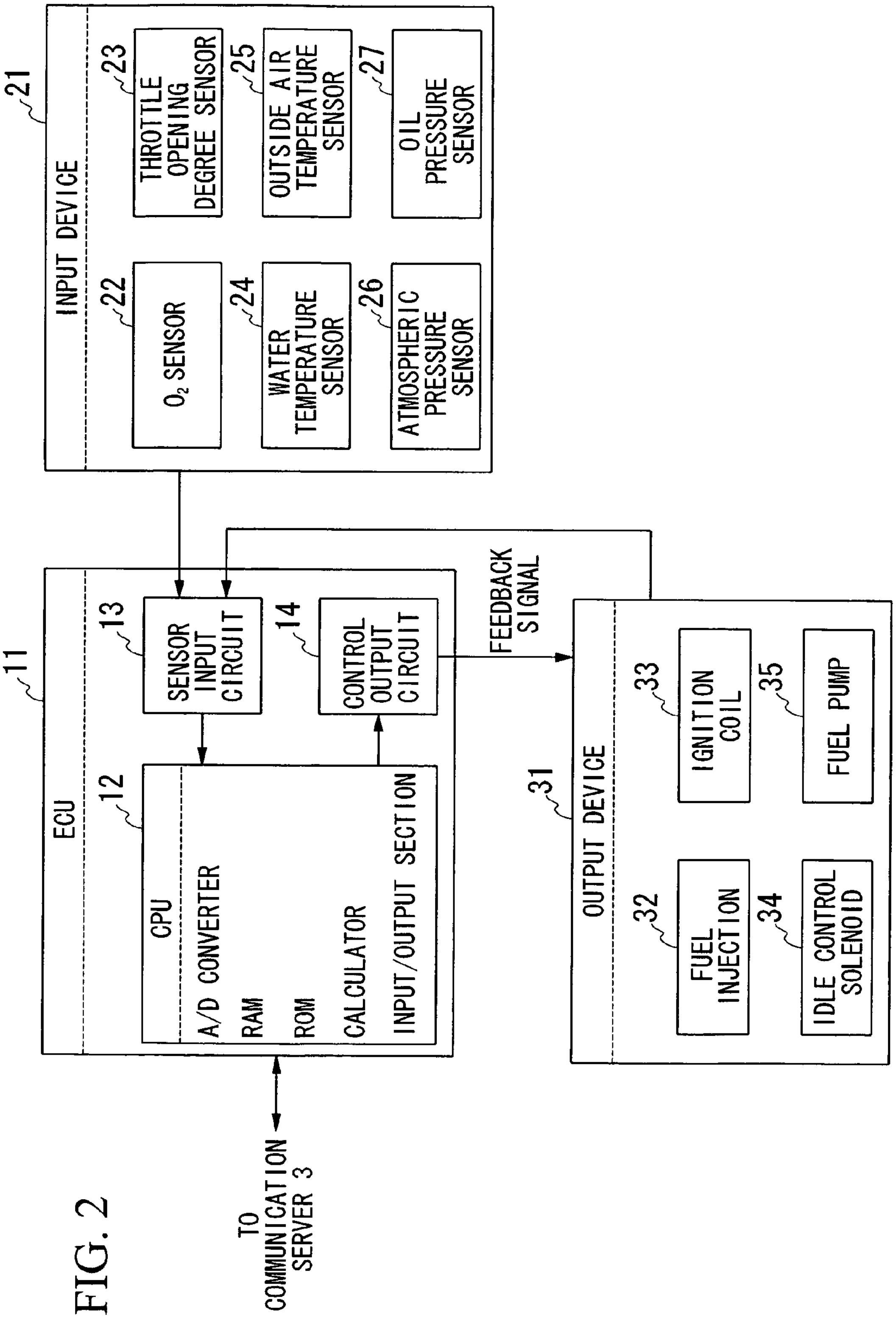
FIG. 2 is a block diagram showing the structure of a vehicle for which the remote maintenance system according to the embodiment performs maintenance.

FIG. 2 is a block diagram showing the structure relating to maintenance on the vehicle 4.

In FIG. 2, an ECU 11 is the control device of the vehicle 4 which is provided with a CPU (Central Processing Unit) 12, and the CPU 12 is provided with:

(1) an A/D converter which performs A/D conversion of signals from various sensors which are mounted in the vehicle 4 and takes in the resultant digital signals;

(2) a RAM (Random Access Memory) which stores data indicating the condition of the various sensors, the various actuators, and so forth mounted in the vehicle 4 and data to be set in the various sensors and the various actuators;

(3) a ROM (Read Only Memory) which stores a vehicle control program, etc., which are executed by the CPU 12;

(4) a computing unit which performs computations for controlling the vehicle 4 using the aforementioned program and data; and (5) an input/output section which serves as an interface between the CPU and an external device.

In addition, the ECU 11 is provided with: a sensor input circuit 13 which inputs the signals from the various sensors mounted in the vehicle 4 into the CPU 12; and a control output circuit 14 which inputs signals which are output from the CPU 12 into the various actuators mounted in the vehicle 4.

On the other hand, the various sensors in the vehicle 4 which are prepared as input devices 21 of the ECU 11 include: for example, an $O_2$ sensor 22 which detects the concentration of oxygen in the intake air of an engine; a throttle opening degree sensor 23 which detects the throttle opening degree of the engine; a water temperature sensor 24 which detects the temperature of engine cooling water; an outside air temperature sensor 25 which detects the temperature of outside air; an atmospheric pressure sensor 26 which detects the atmospheric pressure; and an oil pressure sensor 27 which detects the oil pressure of an engine oil.

Moreover, the various actuators in the vehicle 4 which are prepared as output devices 31 controlled by the ECU 11 include: for example, a fuel injection 32 which controls an amount of fuel injection; an ignition coil 33 which control the ignition timing of the engine; an idling control solenoid 34 which controls the idling engine speed by opening and closing a valve provided in a secondary air passage; and a fuel pump 35 which controls the discharge pressure of a fuel pump.

Next, the operations of the maintenance terminal 1, the communication server 3, and the ECU 11 in the flow of the processing of the aforementioned remote maintenance system which has been explained using FIG. 1 will be described with reference to the drawings.

Figure 3:
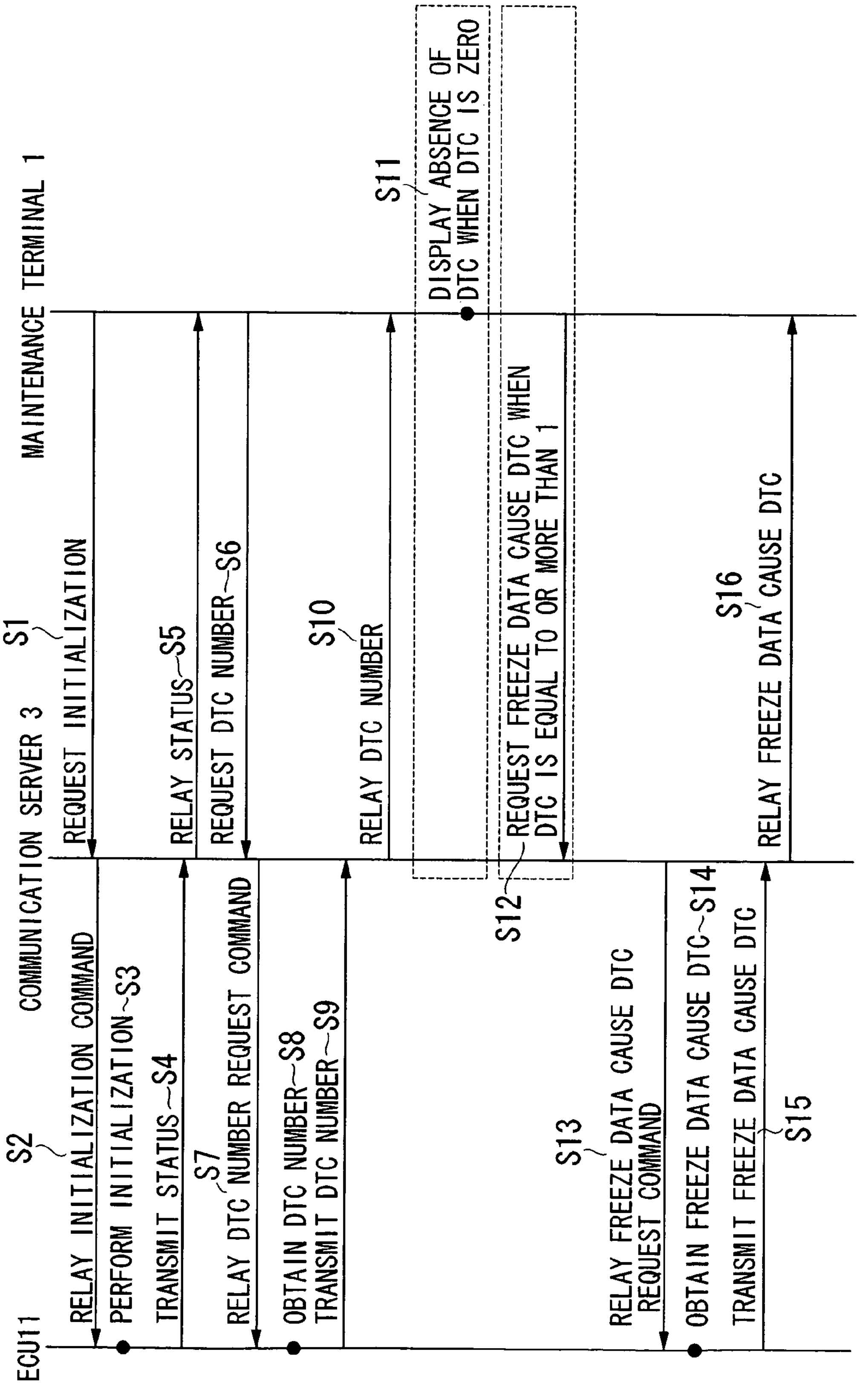
FIG. 3 is a diagram showing the sequence of an overall operation of the remote maintenance system according to the embodiment.
Figure 4:
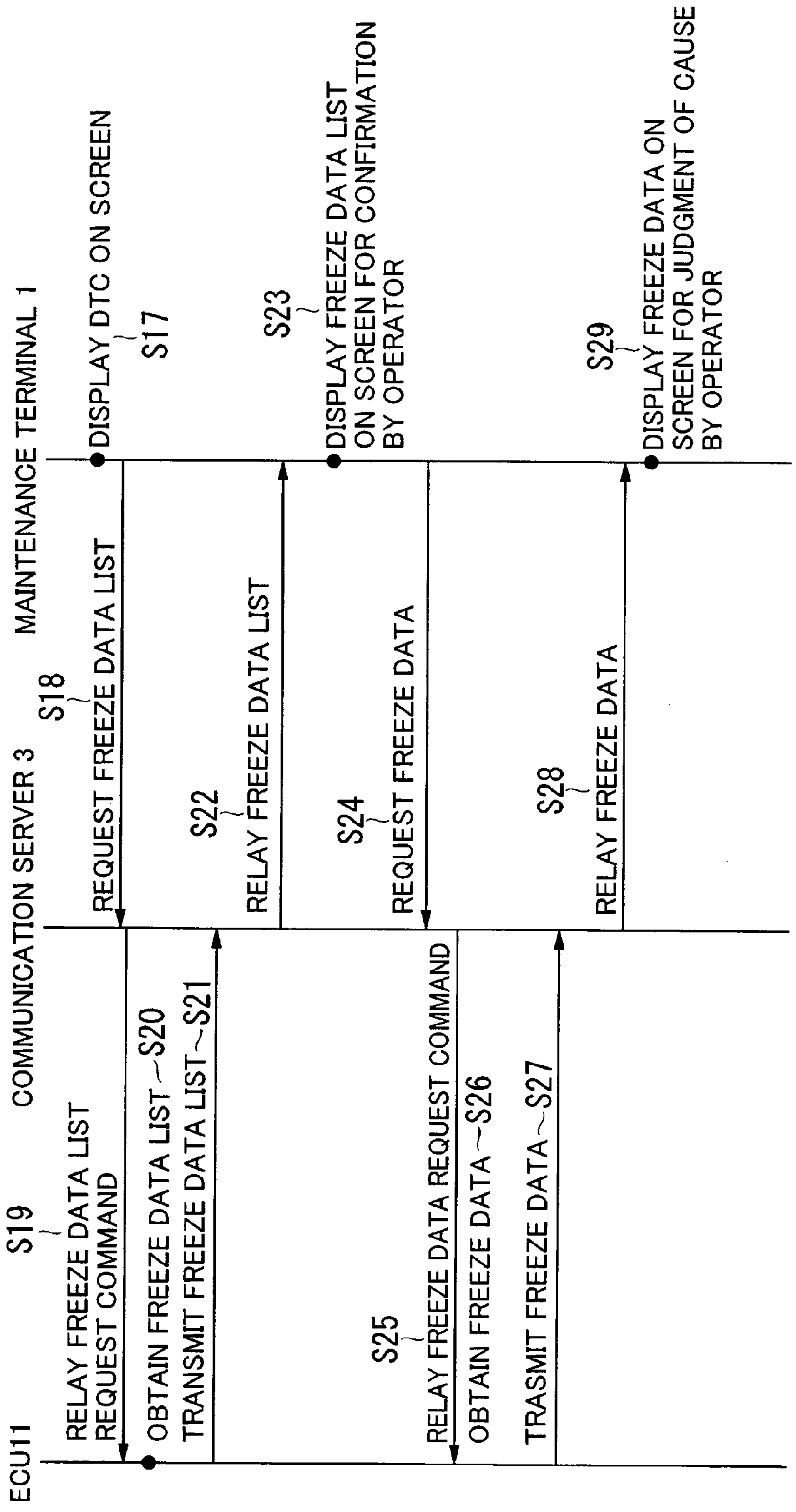
FIG. 4 is a diagram showing the sequence of an overall operation of the remote maintenance system according to the embodiment.

FIGS. 3 and 4 are diagrams showing the sequence of the operations of the maintenance terminal 1, the communication server 3, and the ECU 11 in the processing flow of the remote maintenance system described above. It is noted that the details of data transmitted and received among the maintenance terminal 1, the communication sever 3, and the ECU 11 and the sequence thereof will be explained with reference to FIGS. 3 and 4. Thus, the explanation regarding the operation of the data management server 5 which relays communications between the maintenance terminal 1 and the communication server 3 is omitted here. In addition, the details of the operation of the data management server 5 will be described later.

Referring to FIG. 3, as explained in the example of the processing flow described above, an engineer of the maker 6 first starts the maintenance terminal 1 in response to the notification from the dealer 7 so as to begin the remote maintenance, then the maintenance terminal 1 transmits an initialization request command to the communication server 3 (step S1).

The communication server 3 converts this initialization request command into one which conforms to the communication protocol of the ECU 11, and relays it to the ECU 11 (step S2).

The ECU 11 which has received the initialization request command relayed by the communication server 3 performs initialization (step S3), and then transmits the status of the result obtained by performing the initialization to the communication server 3 (step S4).

Next, the communication server 3 which has received the status of the result obtained by performing the initialization from the ECU 11 converts this status into one which conforms to the communication protocol of the maintenance terminal 1, and then relays it to the maintenance terminal 1 (step S5).

In response to the completion of the initialization by the ECU 11, the maintenance terminal 1 then transmits a command for requesting a DTC number to the communication server 3 (step S6). Here, the DTC number is a failure diagnosis code indicating the condition of the vehicle 4, that is, the number indicating a DTC (Diagnostic Trouble Code).

The communication server 3 which has received the command for requesting the DTC number converts this command into one which conforms to the communication protocol of the ECU 11, and then relays it to the ECU 11 (step S7).

The ECU 11 which has received the DTC number request command relayed by the communication server 3 obtains the DTC number from a storage section (step S8), and transmits it to the communication server 3 (step S9).

The communication server 3 which has received the DTC number from the ECU 11 then converts this DTC number into one which conforms to the communication protocol of the maintenance terminal 1, and relays it to the maintenance terminal 1 (step S10).

The maintenance terminal 1 which has received the DTC number checks the DTC number, and presents the display indicating the absence of a DTC to an operator of the maintenance terminal 1 if the DTC number is equal to zero (step S11).

On the other hand, if the DTC number is equal to or more than one, the maintenance terminal 1 transmits a command for requesting a freeze data cause DTC to the communication server 3 (step S12). Here, freeze data designates the current data when the DTC is issued, and only freeze data corresponding to a single DTC is generally preserved. Thus, data which corresponds to a DTC having the higher priority among DTCs and indicating the most important trouble is preserved as the freeze data. Such a DTC is referred to as a freeze data cause DTC.

The communication server 3 which has received the command for requesting the freeze data cause DTC converts this command into one which conforms to the communication protocol of the ECU 11, and relays it to the ECU 11 (step S13).

The ECU 11 which has received the request command for the freeze data cause DTC relayed by the communication server 3 obtains the freeze data cause DTC from the storage section (step S14), and transmits it to the communication server 3 (step S15).

The communication server 3 which has received the freeze data cause DTC from the ECU 11 then converts this DTC into one which conforms to the communication protocol of the maintenance terminal 11, and relays it to the maintenance terminal 1 (step S16).

Referring now to FIG. 4, the maintenance terminal 1 which has received the freeze data cause DTC along with displaying it for the operator of the maintenance terminal 1 (step S17), transmits a command for requesting a freeze data list to the communication server 3 (step S18). It is noted that when the freeze data cause DTC is displayed for the operator in step S17, the document corresponding to the DTC may be acquired from a database to display the document together with the DTC. Here, the database is provided in the maintenance terminal 1, the communication network 2, or any other places as long as it can be accessed.

The communication server 3 which has received the command for requesting the freeze data list converts this command into one which conforms to the communication protocol of the ECU 11, and relays it to the ECU 11 (step S19).

The ECU 11 which has received the request command for the freeze data list relayed by the communication server 3 obtains the freeze data list from the storage section (step S20), and transmit it to the communication server 3 (step S21).

The communication server 3 which has received the freeze data list from the ECU 11 then converts this list into one which conforms to the communication protocol of the maintenance terminal 11, and relays it to the maintenance terminal 1 (step S22).

The maintenance terminal 1 which has received the freeze data list displays it for the operator of the maintenance terminal 1 so that the operator can select freeze data and request it from the ECU 11 (step S23).

The maintenance terminal 1 then transmits a command for requesting the selected freeze data to the communication server 3 (step S24).

The communication server 3 which has received the command for requesting the freeze data converts this command into one which conforms to the communication protocol of the ECU 11, and relays it to the ECU 11 (step S25).

The ECU 11 which has received the freeze data request command relayed by the communication server 3 obtains the freeze data from the storage section (step S26), and transmits it to the communication server 3 (step S27).

The communication sever 3 which has received the freeze data list from the ECU 11 then converts this list into one which conforms to the communication protocol of the maintenance terminal 1, and relays it to the maintenance terminal 1 (step S28).

The maintenance terminal 1 which has received the freeze data displays it for the operator of the maintenance terminal 1 so that the operator can determine the cause of a failure in the vehicle 4 (step S29).

It is noted that, when a plurality of DTCs exist with respect to a problem, the processes in steps S23 and S29 are repeatedly performed and the operator of the maintenance terminal 1 determines the causes of failures in the vehicle 4.

The foregoing is the operations of the maintenance terminal 1, the communication server 3, and the ECU 11 in the processing flow of the remote maintenance system. Next, data and commands which are transmitted and received between the maintenance terminal 1 and the ECU 11 will be explained with reference to the drawings.

FIG. 5 is a diagram showing an example of a request message which is transmitted from the maintenance terminal 1 to the ECU 11 via the communication server 3. As shown in FIG. 5, the request message is a signal having a maximum data length of 11 bytes, and the first through third bytes includes fixed data. In addition, the fourth through tenth bytes form a data area having a maximum length of 7 bytes, and the eleventh byte includes a checksum. With this message, the maintenance terminal 1 requests from the ECU 11: (1) a dummy message; (2) a full current data list; (3) an extended current data list; (4) current data; (5) a freeze data cause DTC; (6) a full freeze data list; (7) an extended freeze data list; (8) freeze data; (9) a DTC number; (10) a DTC; or the like.

On the other hand, FIG. 6 is a diagram showing an example of a response message which is transmitted from the ECU 11 to the maintenance terminal 1 via the communication server 3. As shown in FIG. 6, the response message is a signal having a maximum data length of 11 bytes similar to the request message, and the first and second bytes include fixed data. In addition, the third byte includes an internal address of the ECU, and the fourth through tenth bytes form a data area having a maximum length of 7 bytes. Moreover, the eleventh byte includes a checksum.

It is particularly noted that 32 kinds of information can be transmitted and received using a four-byte data frame, one byte being eight bits, whose length is 32 bits in total, that is, the sixth through ninth bytes of: (1) the dummy message; (2) the full current data list; (3) the extended current data list; (4) the current data; and (9) the DTC number, and the seventh through tenth bytes of: (6) the full freeze data list; (7) the extended freeze data list; and (8) the freeze data. For example, when the first bit of the (6) full freeze data list having a 32 bits length is set to “1”, information about the concentration of oxygen from the $O_2$ sensor 22 is stored as the freeze data. When the second bit of the (6) full freeze data list is set to “1”, information about the throttle opening degree from the throttle opening degree sensor 23 is stored as the freeze data. When the third bit of the (6) full freeze data list is set to “1”, information about the temperature of the engine cooling water from the water temperature sensor 24 is stored as the freeze data.

Moreover, three kinds of DTCs each having 16-byte length are transmitted using the fifth and sixth bytes of the (10) DTC, the seventh and eighth bytes of the (10) DTC, and the ninth and tenth bytes of the (10) DTC, respectively. Thus, the ECU 11 transmits to the maintenance terminal 1 with: (1) the dummy message; (2) the full current data list; (3) the extended current data list; (4) the current data; (5) the freeze data cause DTC; (6) the full freeze data list; (7) the extended freeze data list; (8) the freeze data; (9) the DTC number; (10) the DTC; or the like.

As shown in the request message and the response message shown in FIGS. 5 and 6, it is noted that the data involved in requesting and transmitting (1) the dummy message is the same as the data involved in requesting and transmitting (2) the full current data list. That is, the present embodiment assumes that the data which is transmitted and received as dummy (pretended) data is the same as the data involved in requesting and transmitting the full current data list. Here, the dummy message is a message which is transmitted at a constant interval so as to prevent the mode of the ECU 11 returning to the normal mode when it has been changed from the normal mode to the failure diagnosis mode as a result of initialization.

Moreover, the formats of the aforementioned request messages and the response messages comply with the message formats of communication standards SAE1978, SAE1979, or ISO9141-2.

Furthermore, in the above explanation, a description has been made with reference to the diagrams showing the sequence of the operations of the maintenance terminal 1, the communication server 3, and the ECU 11 in the processing flow of the remote maintenance system without explaining the operation of the data management server 5 which relays communications between the maintenance terminal 1 and the communication sever 3. Hereinbelow, the operation of the data management server 5 will be explained with reference to the drawings.

First, the operation of the data management server 5 when it receives data transmitted from the maintenance terminal 1 or the communication server 3 will be explained with reference to the flowchart shown in FIG. 7.

Figure 7:
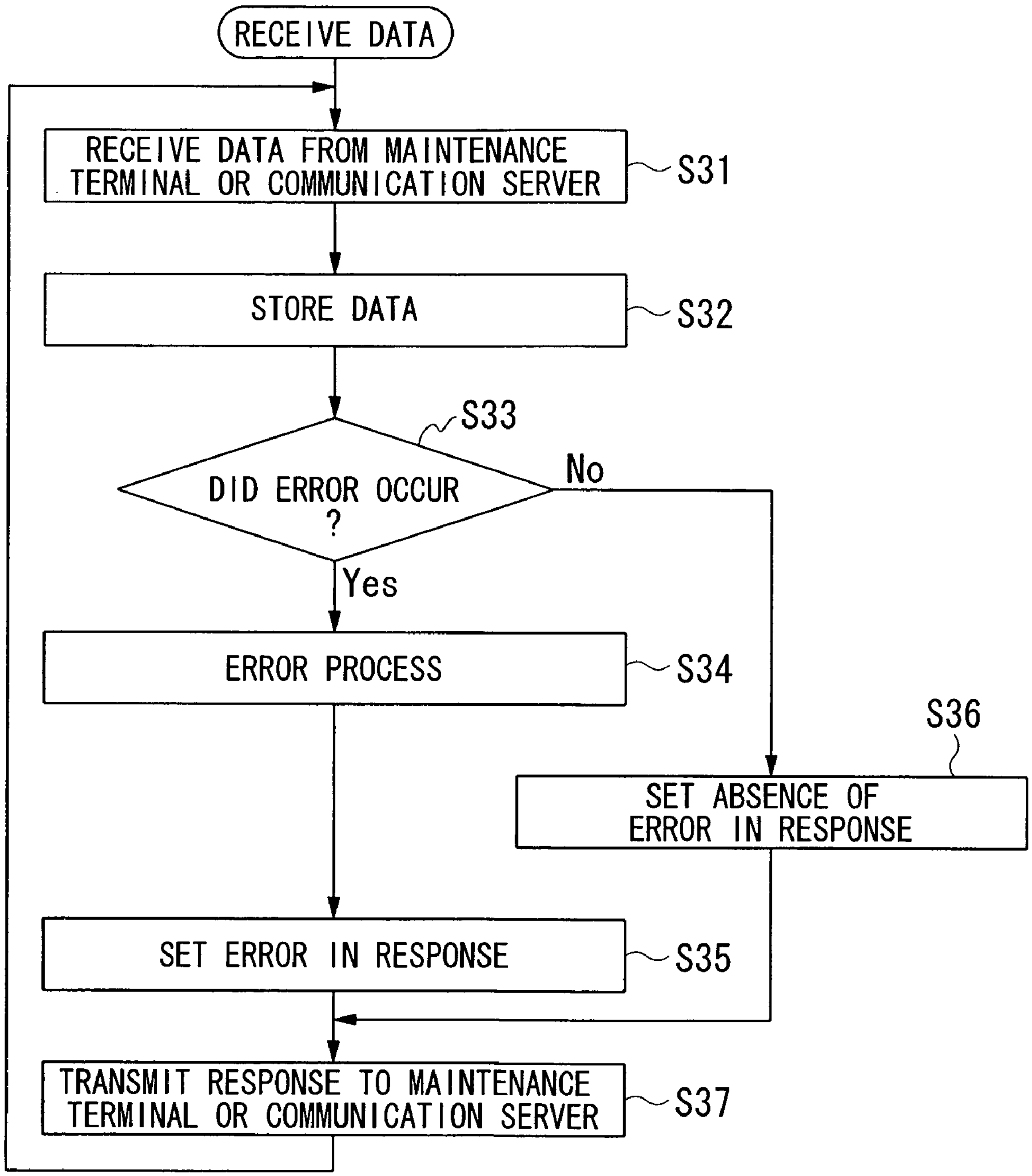
FIG. 7 is a flowchart showing a data reception operation performed by a data management server which is provided in the remote maintenance system according to the embodiment.

First, as shown in FIG. 7, upon the reception of data from the maintenance terminal 1 or the communication sever 3 (step S31), the data management server 5 stores the received data in the storage section which is provided in the data management server 5 (step S32).

Next, it is determined whether an error occurred with respect to the reception of the data (step S33). If an error occurred (YES in step S33), an error process is performed (step S34) and then a response signal is set so as to indicate the presence of an error (step S35).

Conversely, if an error did not occur in step S33 (NO in step S33), the response signal is set so as to indicate the absence of an error (step S36).

Subsequently, after the completion of the setting of the response signal, the response signal is transmitted to the maintenance terminal 1 or the communication server 3 which has transmitted the data (step S37).

Next, the data request reception operation of the data management server 5 when data is requested by the maintenance terminal 1 or the communication server 3 will be explained with reference to the flowchart shown in FIG. 8.

Figure 8:
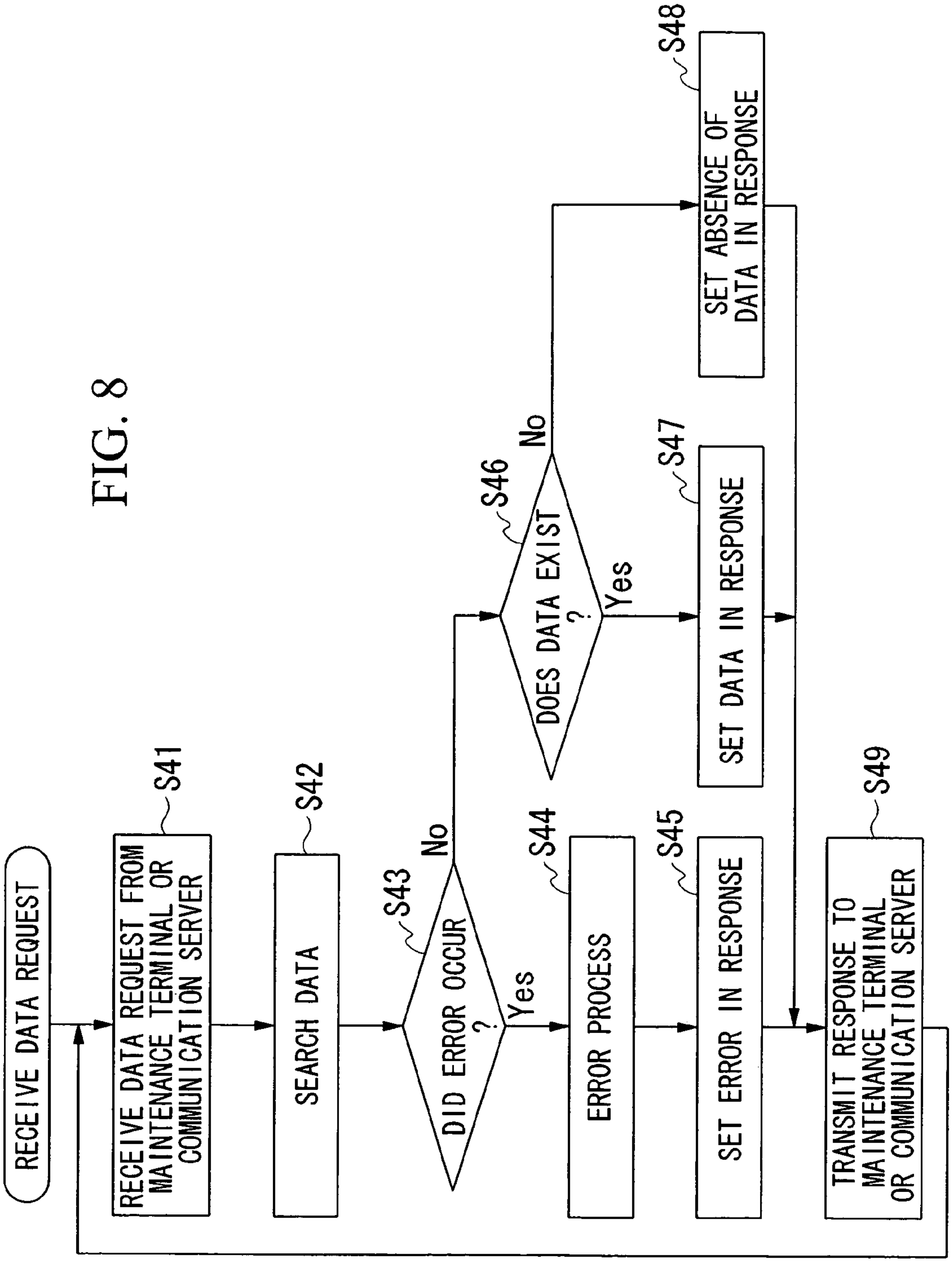
FIG. 8 is a flowchart showing a data request reception operation performed by the data management server which is provided in the remote maintenance system according to the embodiment.

First, as shown in FIG. 8, in response to the reception of a data request from the maintenance terminal 1 or the communication server 3 (step S41), the data management server 5 searches the requested data from the storage section which is provided in the data management server 5 (step S42).

Subsequently, it is determined whether an error occurred with respect to the reception of a data request (step S43). If an error occurred (YES in step S43), an error process is performed (step S44) and then a response signal is set so as to indicate the presence of an error (step S45).

Conversely, if an error did not occurred in step S43 (NO in step S43), the data management server 5 determines whether the request data is stored in the storage section step S46).

If it is determined in step S46 that the requested data is stored in the storage section (YES in step S46), the request data itself is set in the response signal (step S47).

Conversely, if it is determined in step S46 that the requested data is not stored in the storage section (NO in step S46), the response signal is set so as to indicate the absence of data (step S48).

Subsequently, after the completion of the setting of the response signal, the response signal is transmitted to the maintenance terminal 1 or the communication server 3 which was transmitted the data (step S49).

It is noted that a method of relaying a command between the maintenance terminal 1 and the communication server 3 which is performed by the data management server 5 is the same as the aforementioned method of relaying data, so that the explanation thereof is omitted here.

Hereinbelow, the data structure of a signal which is transmitted from the maintenance terminal 1 or the communication server 3 when the aforementioned data management server 5 receives data or a data request command and a signal which is transmitted from the maintenance terminal 1 or the communication server 3 in response to the data or the data request command, and a method of managing the received data by the data management server 5 will be explained with reference to FIGS. 9A through 9C.

As shown in FIG. 9A, the basic data structure is such that transmission source information having a length of 20 bytes, transmission destination information having the same length of 20 bytes, and a data or command area having a variable length which includes information transmitted and received between the maintenance terminal 1 and the communication server 3 are included. Here, the relationship between the transmission source and the transmission destination is determined as follows.

For example, when the communication server 3 requests a command from the maintenance terminal 1, "server" indicating the communication server 3 is set in the transmission source and "client" indicating the maintenance terminal 1 is set in the transmission destination as shown by (1) in FIG. 9B, and a signal having the structure shown in FIG. 9A together with a "getdata" command are transmitted to the data management server 5. In this case, nothing is set in the data or command area.

Similarly, for example, when the maintenance terminal 1 transmits a command requested by the communication server 3, "client" indicating the maintenance terminal 1 is set in the transmission source and "server" indicating the communication server 3 is set in the transmission destination as shown by (2) in FIG. 9B, and a signal having the structure shown in FIG. 9A together with a "putdata" command are transmitted to the data management server 5. In this case, information for the ECU 11 is set in the data or command area.

Furthermore, for example, when the maintenance terminal 1 requests data from the communication server 3, "client" indicating the maintenance terminal 1 is set in the transmission source and "server" indicating the communication server 3 is set in the transmission destination as shown by (3) in FIG. 9B, and a signal having the structure shown in FIG. 9A together with a "getdata" command are transmitted to the data management server 5. In this case, nothing is set in the data or command area.

Similarly, for example, when the communication server 3 transmits data requested by the maintenance terminal 1, "server" indicating the communication server 3 is set in the transmission source and "client" indicating the maintenance terminal 1 is set in the transmission destination as shown by (4) in FIG. 9B, and a signal having the structure shown in FIG. 9A together with a "putdata" command are transmitted to the data management server 5. In this case, information received from the ECU 11 is set in the data or command area.

In addition, in order to realize transmission and reception of data which designates a transmission source and a transmission destination, the data management server 5 manages data files as shown in FIG. 9C. That is, in order to deal with a plurality of transmission sources, a plurality of transmission destinations, the transmission of a plurality of pieces of data to the same transmission destination, and reception of a plurality of pieces of data from the same transmission source, the data management server 5 uses sequential management files each specifies a transmission source and a transmission destination and transmission and reception buffer files each specifies a transmission source and a transmission destination.

Each of the sequential management files as shown by (1) and (2) in FIG. 9C stores a sequential number up to $2^{64}$, and sequential management files for requesting data or a command and sequential management files for transmitting data or a command are separately created. Moreover, both the files for request and the files for transmission are grouped and managed in accordance with information about a transmission source and a transmission destination. Furthermore, the sequential number stored in a sequential management file is incremented by one whenever communication corresponding to the sequential management file is performed between the maintenance terminal 1 and the communication server 3.

On the other hand, the transmission and reception buffer files as shown by (3) and (4) in FIG. 9C buffer data and commands which are actually transmitted and received between the maintenance terminal 1 and the communication server 3, and transmission and reception buffer files for requesting data or a command and transmission and reception buffer files for transmitting data or a command are separately created. Moreover, in the same manner as the sequential management files, the files for request and the files for transmission are grouped and managed in accordance with information about a transmission source and a transmission destination.

In addition, as shown in FIG. 9C, a file name of a transmission and reception buffer file includes information about a transmission source and a transmission destination, and a sequential number which is stored in the corresponding sequential management file in order to manage concrete exchanges of data and commands which are transmitted and received between the maintenance terminal 1 and the communication server 3 in the order of the exchanges.

With this structure, the data management server 5 individually manages data and commands which are transmitted and received between a plurality of maintenance terminals 1 and a plurality of communication servers 3 for individual combinations of the maintenance terminals 1 and the communication server 3 in chronological order, thereby making it possible to properly relay data and commands transmitted and received between the maintenance terminals 1 and the communication server 3.

It is noted that the above-described embodiment has placed emphasis on DTCs as information transmitted from the ECU 11 to the maintenance terminal 1 via the communication server 3; however, for example, it is possible to connect an imaging device such as a camera and a sound collecting device such as a microphone to the ECU 11 or the communication server 3 and to transmit images and sounds to diagnose the condition of the vehicle 4 to the maintenance terminal 1. With this structure, an operator of the maintenance terminal 1 can obtain detailed information about the vehicle 4.

In addition, the remote maintenance system according to the above-described embodiment has mainly explained transmission and reception of data and commands between the ECU 11 and the maintenance terminal 1; however, for example, it is possible to simultaneously perform transmission and reception of data and commands, and telephonic voice communication between an engineer of the maker 6 and a technician of the dealer 7 by the communication network 2 which employs technologies of ISDN, ADSL (Asymmetric Digital Subscriber Line), IP Phone, and so forth. This structure makes it possible to perform remote maintenance while confirming the detailed conditions, so that more reliable diagnostic results and the contents of repairs can be obtained.

Moreover, it is not necessary to provide the data management server 5 which has been explained in the aforesaid embodiment when only a single maintenance terminal 1 and a single communication sever 3 are installed.

According to the remote maintenance system of the present embodiment explained above, if a malfunction has occurred in the vehicle 4, the vehicle 4 is taken to the dealer 7 and is connected to the communication server 3 at the dealer 7, thereby enabling communication between the maintenance terminal 1 provided at the maker 6 and the ECU 11 mounted in the vehicle 4. Accordingly, an engineer of the maker 6 obtains maintenance information indicating the condition of the vehicle 4 from the ECU 11 by using the maintenance terminal 1. By evaluating the maintenance information, it is possible for the engineer to provide appropriate instructions to the technician of the dealer 7, and to perform maintenance on the vehicle 4 by manipulating the maintenance terminal 1 by his own initiative.

Therefore, it is possible to perform detailed maintenance from a remote location, which was conventionally performed after going to a place where the vehicle 4 is located.

INDUSTRIAL APPLICABILITY

According to the present invention, it is not necessary for the operator of the maintenance terminal to go to a location at which the mobile object is located, so that time and cost due to travel can be reduced. The reduction in time due to travel makes it possible to improve the efficiency of maintenance. Moreover, the control device can be freely manipulated via the maintenance terminal, and it is possible to deal with an event for which immediate measures must be taken. Furthermore, since the maintenance terminal can function so long as it is connected to the communication network, the operator of the maintenance terminal can perform maintenance regardless of the location at which the mobile object is located and the location at which the operator is present. In addition, since maintenance can be performed so long as it is connected to the communication network, it is possible to perform maintenance regardless of the number of mobile objects. Moreover, the operator of the maintenance terminal can easily obtain logging data regarding the mobile object which is the subject of maintenance.

In addition, the present invention makes it possible to improve efficiency of communications between the maintenance terminal and the communication server. Moreover, since the data management server controls the data flow by buffering the data, it is sufficient for the maintenance terminal to communicate with the data management server as a specific communication party even when a plurality of pieces of data are transmitted and received between the maintenance terminal and a plurality of mobile objects. Thus, it is possible to reduce the load on the communication processes.

Moreover, according to the present invention, when the data management server relays the transmission and reception data between the plurality of communication servers and the plurality of maintenance terminals, it is possible to relay the transmission and reception data between a correct transmission source and a correct transmission destination. Moreover, since information regarding the transmission source and the transmission destination can be identified without inspecting the contents of the transmission and reception data, it is possible to improve the efficiency of communication.

The invention claimed is:

1. A remote maintenance system which performs maintenance on a mobile object by monitoring a control device of the mobile object from a remote location comprising:

a maintenance terminal at the remote location and which is connected to a communication network, displays maintenance information indicating the condition of the mobile object which has been received from the communication network for an operator, and transmits control information for the control device to the communication network;

a communication server separate from the mobile object which is connected between the control device and the communication network, transmits the maintenance information which has been acquired from the control device to the maintenance terminal, and receives the control information which has been transmitted from the maintenance terminal to set the control information in the control device;

and an imaging device and a sound collecting device which are connected to at least one of the control device and the communication server and which transmit an image and sound, respectively, to the maintenance terminal so as to diagnose the condition of the mobile object.

2. A remote maintenance system according to claim 1, further comprising a data management server which stores the maintenance information and the control information which are transmitted and received between the maintenance terminal and the communication server, and mediates communications between the maintenance terminal and the communication server, wherein the maintenance terminal and the communication server transmit and receive the maintenance information and the control information via the data management server.

3. A remote maintenance system according to claim 2, wherein the data management server stores the maintenance information in a file whose file name includes information indicating a transmission source and a transmission destination of the maintenance information and stores the control information in a file whose file name includes information indicating a transmission source and a transmission destination of the control information.

4. A remote maintenance system according to claim 1, wherein the communication server converts a communication protocol used for data transmission and reception on the communication network into a communication protocol for data transmission and reception with the control device, and also converts a communication protocol for data transmission and reception with the control device into a communication protocol used for data transmission and reception on the communication network.

* * * * *